(12) United States Patent
Oneda et al.

(10) Patent No.: US 9,641,719 B2
(45) Date of Patent: May 2, 2017

(54) METHOD FOR SEARCHING CAPTURED IMAGES USING IDENTIFICATION INFORMATION

(71) Applicant: FUJI XEROX CO., LTD., Tokyo (JP)

(72) Inventors: Yuichi Oneda, Yokohama (JP); Shoji Sakamoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/694,530

(22) Filed: Apr. 23, 2015

(65) Prior Publication Data
US 2016/0127597 A1    May 5, 2016

(30) Foreign Application Priority Data
Oct. 30, 2014    (JP) ................. 2014-221053

(51) Int. Cl.
   *H04N 1/21*    (2006.01)
   *H04N 5/232*    (2006.01)
   *G06Q 30/04*    (2012.01)

(52) U.S. Cl.
   CPC ........... *H04N 1/2108* (2013.01); *G06Q 30/04* (2013.01); *H04N 5/23206* (2013.01)

(58) Field of Classification Search
   CPC ................ G08B 2206/00; H04N 5/23206
   See application file for complete search history.

(56) References Cited

U.S. PATENT DOCUMENTS

| | | | | |
|---|---|---|---|---|
| 5,774,869 A | * | 6/1998 | Toader | G06Q 20/04 705/14.14 |
| 6,016,509 A | * | 1/2000 | Dedrick | G06Q 10/107 705/14.66 |
| 6,038,333 A | | 3/2000 | Wang | |
| 6,711,287 B1 | * | 3/2004 | Iwasaki | G06K 9/4652 382/165 |
| 8,924,890 B2 | * | 12/2014 | Begeja | G06F 3/048 707/766 |
| 2006/0018652 A1 | | 1/2006 | Sugiura et al. | |
| 2006/0104483 A1 | | 5/2006 | Harel et al. | |
| 2006/0167820 A1 | * | 7/2006 | Jeong | G06F 21/31 705/67 |
| 2006/0227992 A1 | * | 10/2006 | Rathus | G06F 17/30247 382/100 |
| 2008/0301128 A1 | * | 12/2008 | Gandert | G06F 17/30265 |

(Continued)

FOREIGN PATENT DOCUMENTS

JP    2010224745 A    10/2010

OTHER PUBLICATIONS

Apr. 21, 2016 Office Action issued in Australian Patent Application No. 2015202328.

*Primary Examiner* — James Hannett
(74) *Attorney, Agent, or Firm* — Oliff PLC

(57) ABSTRACT

There is provided a non-transitory computer readable medium. An imaging unit captures an image. A search request unit requests a search by using identification information for identifying a person described in the image or a medium having the image printed thereon. A reception unit receives image feature values corresponding to the identification information, as a result of the search. An acquisition unit acquires information for accessing a content or content information when the received image feature values and image feature values extracted from the captured image correspond to each other.

14 Claims, 15 Drawing Sheets

(56) References Cited

U.S. PATENT DOCUMENTS

| | | | |
|---|---|---|---|
| 2010/0329519 A1* | 12/2010 | Shuster | G06F 17/30265 382/118 |
| 2011/0123132 A1 | 5/2011 | Schneck et al. | |
| 2012/0321145 A1* | 12/2012 | Saito | G06F 17/30256 382/118 |
| 2013/0179834 A1* | 7/2013 | Begeja | G06F 3/048 715/810 |
| 2013/0226850 A1* | 8/2013 | Hannuksela | G10L 25/48 706/14 |
| 2014/0104456 A1* | 4/2014 | Wang | G06F 17/30247 348/231.2 |

* cited by examiner

FIG. 9

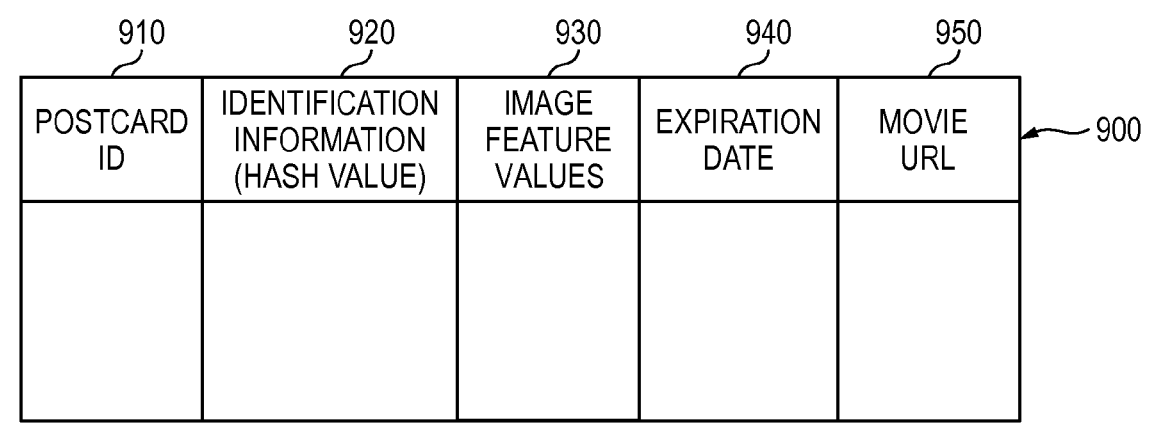

| POSTCARD ID | IDENTIFICATION INFORMATION (HASH VALUE) | IMAGE FEATURE VALUES | EXPIRATION DATE | MOVIE URL |
|---|---|---|---|---|
| 910 | 920 | 930 | 940 | 950 |
|  |  |  |  |  |

900

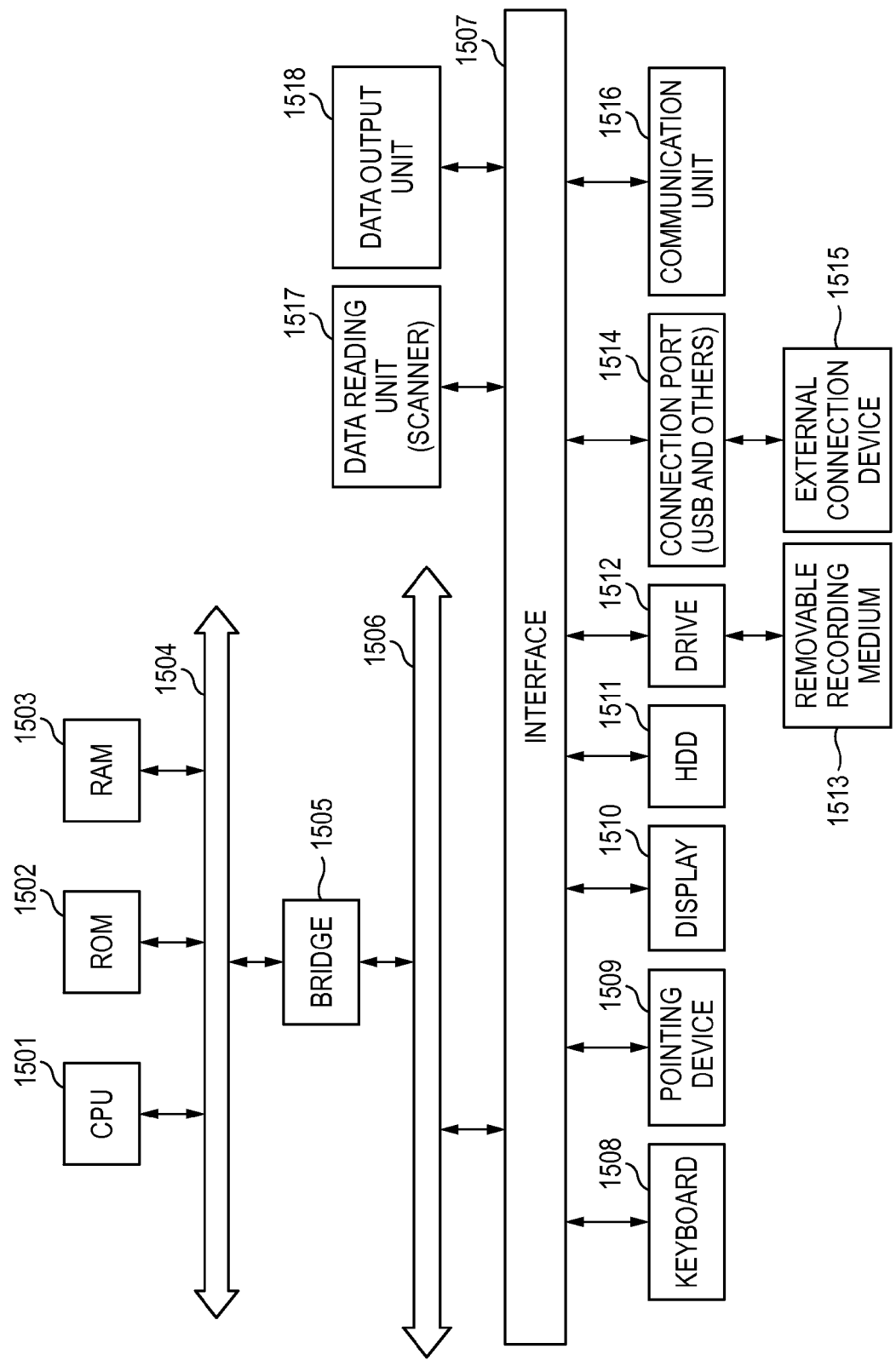

METHOD FOR SEARCHING CAPTURED IMAGES USING IDENTIFICATION INFORMATION

CROSS-REFERENCE TO RELATED APPLICATIONS

This application is based on and claims priority under 35 U.S.C. §119 from Japanese Patent Application No. 2014-221053 filed on Oct. 30, 2014.

TECHNICAL FIELD

The present invention relates to a non-transitory computer readable medium.

SUMMARY

According to an aspect of the embodiments of the present invention, there is provided a non-transitory computer readable medium storing a program for causing an information processing apparatus to function as: an imaging unit that captures an image; a search request unit that requests a search by using identification information for identifying a person described in the image or a medium having the image printed thereon; a reception unit that receives image feature values corresponding to the identification information, as a result of the search; and an acquisition unit that acquires information for accessing a content or content information when the received image feature values and image feature values extracted from the captured image correspond to each other.

BRIEF DESCRIPTION OF THE DRAWINGS

Exemplary embodiments of the present invention will be described in detailed based on the following figures, wherein:

FIG. 9 shows an example of a data structure of a postcard information table;

FIG. 15 is a block diagram showing a hardware configuration example of a computer configured to implement the illustrative embodiment.

DETAILED DESCRIPTION

Hereinafter, a variety of illustrative embodiments suitable for implementation of the present invention will be described with reference to the drawings.

First Illustrative Embodiment

Figure 1:
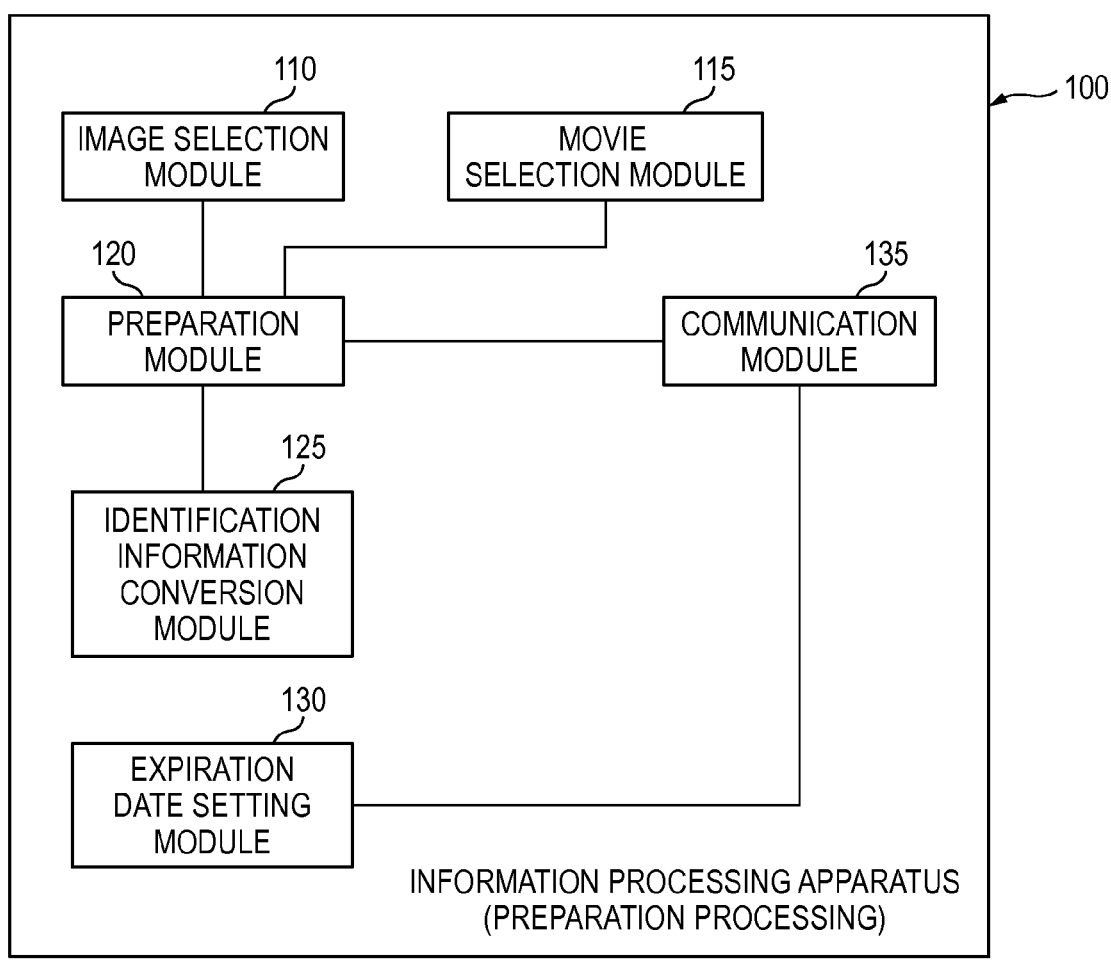
FIG. 1 is a conceptual module configuration view relating to a configuration example of a first illustrative embodiment (information processing apparatus (preparation processing))

FIG. 1 is a conceptual module configuration view relating to a configuration example of a first illustrative embodiment.

It should be noted that a module refers to a software component that is logically separable (a computer program), or a hardware component. Therefore, the module in the illustrative embodiment refers to not only a module in a computer program but also a module in a hardware configuration. For this reason, the description of the illustrative embodiment also serves as descriptions of computer programs for enabling the modules to function (including a program for enabling a computer to execute each procedure, a program for enabling the computer to function as each means, and a program for enabling the computer to implement each function), a system and a method. For convenience of description, 'stores information,' 'causes information to be stored,' and other phrases equivalent thereto are used. However, when the illustrative embodiment is a computer program, these phrases are intended to express 'causes a storage device to store information' or 'controls a storage device to store information.' The modules may correspond to the functions in a one-to-one correspondence. However, in implementation, one module may be composed of one program or multiple modules may be composed of one program, and inversely, one module may be composed of multiple programs. Also, a plurality of modules may be executed by a single computer, and a single module may be executed by a plurality of computers in a distributed or parallel environment. In the meantime, one module may include another module. Also, in the following description, 'connection' refers to not only a physical connection but also a logical connection (such as an exchange of data, instructions, and data reference relationship). 'Predetermined' means that something is determined in advance of a process of interest, and thus intends to refer to something that is determined in advance of a process of interest in the illustrative embodiment but also even after a process in the illustrative embodiment has started, something that is determined in advance of a process of interest depending on a condition or a status of the illustrative embodiment at the present point of time or depending on a condition or status heretofore continuing down to the present point of time. When there is a plurality of 'predetermined values', they may be different, respectively, or two or more values (including all values) thereof may be the same. In addition, a description that means 'If A, B is performed' is used to convey the meaning 'it is determined whether a condition A is satisfied, and if the condition A is satisfied, B is performed.' However, this is not applicable if the determination as to whether the condition A is satisfied or not is unnecessary.

Also, a system or an apparatus refers to a configuration in which a plurality of computers, a hardware configuration, an apparatus and the like are interconnected via a communication means such as a network (including a one-to-one communication connection), and also includes a case implemented by a single computer, a hardware configuration, an apparatus and the like. The word 'apparatus' and the word 'system' have the same definition. Of course, the 'system' does not include merely a social 'structure' (social system) formulated by humans.

Also, at each process performed by a module, or at one of the processes performed by a module, information to be processed is read from a storage device and then processed, and thereafter, the process results are written onto the storage device. Accordingly, the descriptions of reading of the information from the storage device prior to the process and writing of the processed information onto the storage device subsequent to the process are omitted in some cases. The storage devices here may include a hard disc, a random access memory (RAM), an external storage medium, a storage device connected via a communication line, a register within a central processing unit (CPU), and the like.

In an information processing apparatus that is a first illustrative embodiment, a print medium prepared by an information processing apparatus (preparation processing) 100 is read by an information processing apparatus (reading processing) 200, and the information processing apparatus (preparation processing) 100 includes an image selection module 110, a movie selection module 115, a preparation module 120, an identification information conversion module 125, an expiration date setting module 130, and a communication module 135, as shown in FIG. 1. The information processing apparatus (preparation processing) 100 may be implemented as a personal computer (PC), a portable terminal apparatus (a mobile phone including a smart phone, and the like), and the like having a communication function, for example.

The information processing apparatus (preparation processing) 100 is configured to select an image and to print identification information on a medium together with the selected image or to issue an instruction for the printing. The information processing apparatus is configured to select a content corresponding to the selected image. Here, the 'medium' includes a postcard (including a greeting card and the like), a business card, and the like, and a material (paper, plastic and the like) thereof is not particularly limited. When the medium is a postcard, the image may include a family photograph of a sender, a landscape photograph of a place where the sender has traveled, and the like, for example. When the medium is a business card, the image may include a personal headshot. However, the image is not limited thereto, and any image that can be printed on a medium may be used. Also, as a source of the image, one frame (one scene) of a movie may be used or one of images may be selected. As the identification information, when the medium is a postcard and the like, a zip code, an address, a name and the like of the sender may be used. When the medium is a business card, a name, a company name, a telephone number, a mail address and the like may be used as the identification information. However, the identification information is not limited thereto, and information that can be printed on a medium and information for identifying a person printed on a medium or information for identifying the medium may be preferably used. The information for identifying the medium may be information for identifying each medium, for example, the information for identifying the person who is a sender. Specifically, a serial number and the like indicating a person or medium may be used. Also, here, as the 'content (content information)', movie data (including 3D movie data), still image data (including 3D image data), voice data, text data, a combination thereof and the like may be used. For example, a movie in which the image (image printed on the medium) is used as a first frame, an image relating to the image, voice relating to the image, a homepage (HP) relating to the image and the like may be used. Meanwhile, hereinafter, a postcard, a combination of a zip code, an address and a name of a sender, and a movie will be mainly exemplified as the print medium, the identification information and the content, respectively.

In the meantime, not only one postcard but also a plurality of postcards (postcards for which different images are used) may be used for one sender.

The image selection module 110 is connected to the preparation module 120. The image selection module 110 is configured to select an image to be printed on a medium. For example, the image selection module 110 may be configured to select an image from an image database, to select one frame of a movie selected with the movie selection module 115, and to select an image captured using a scanner, a camera (including a still image camera, a digital video camera, and the like) provided for the information processing apparatus (preparation processing) 100, in accordance with a user's selection operation performed on a touch panel, a keyboard, a mouse and the like provided for the information processing apparatus (preparation processing) 100.

The movie selection module 115 is connected to the preparation module 120. The movie selection module 115 is configured to select a movie as a content corresponding to the image selected by the image selection module 110. For example, the movie selection module 115 may be configured to select a movie from a movie database, to select a movie including the image (frame) selected by the image selection module 110, and to select a movie captured using the camera (including a digital video camera, and the like) provided for the information processing apparatus (preparation processing) 100, in accordance with a user's selection operation.

The preparation module 120 is connected to the image selection module 110, the movie selection module 115, the identification information conversion module 125, and the communication module 135. The preparation module 120 is configured to generate a print image, which is an image to be printed on a medium such as a postcard, by using the image selected by the image selection module 110. Also, the preparation module 120 is configured to receive the identification information such as a zip code, an address, a name and the like of a sender, to synthesize the identification information with the image selected by the image selection module 110 and the generate a print image. Also, the preparation module 120 may be configured to process the image selected by the image selection module 110. The processing may include addition of a character, another image, a figure and the like, enlargement and reduction, rotation, affine transform such as transform, color processing such as color conversion, and the like. In the meantime, the identification information may be input by a user's input operation or may be selected from an identification information list (for example, an address book database, and the like) stored in advance.

The preparation module 120 is configured to enable a printing apparatus provided for the information processing apparatus (preparation processing) 100 or a printing apparatus connected via the communication module 135 to print the generated print image on a medium such as a postcard.

Also, the preparation module 120 is configured to transmit the identification information such as a zip code, an address, a name and the like of a sender to an application server 310 through the communication module 135. Alternatively, the preparation module 120 may be configured to transfer the identification information such as a zip code, an address, a name and the like of a sender to the identification information conversion module 125 and to transmit conversion information after conversion to the application server 310 through the communication module 135. That is, the 'conversion information' is a concept configuring a part of the identification information. Therefore, (1) the identification information may be transmitted or (2) the conversion information obtained by converting the identification information in a predetermined manner may be transmitted. Accompanied by this, the application server 310 (an application server 1410, in a second illustrative embodiment) may be configured to receive (1) the identification information or (2) the conversion information. In a storage device (for example, a postcard information table 900 shown in FIG. 9) of the application server 310 (the application server 1410, in the second illustrative embodiment), (1) image feature values may be stored in correspondence to the identification information, or (2) the image feature values may be stored in correspondence to the conversion information. Hereinafter (including the second illustrative embodiment), the 'conversion information' will be mainly exemplified. However, when the conversion information is referred to as the identification information before conversion, a case of using the identification information is described. When the identification information is used, the processing (for example, processing of generating a hash value) that is executed by the identification information conversion module 125 and an identification information conversion module 230 is not required.

Subsequently, the image selected by the image selection module 110 and the movie selected by the movie selection module 115 are associated and transmitted to the application server 310 through the communication module 135.

The identification information conversion module 125 is connected to the preparation module 120. The identification information conversion module 125 is configured to convert the identification information received from the preparation module 120 and to generate the conversion information. Here, the 'conversion' is processing for keeping the identification information confidential in the communication performed through the communication module 135. For instance, encryption processing, hash processing and the like may be exemplified. In the case of the hash processing, the conversion information is a hash value. Hereinafter, the hash processing will be mainly exemplified. Also, the identification information to be converted may be a part or all of the identification information. For example, all of a zip code, an address and a name of a sender may be converted into hash values or the zip code and the name of the sender may be converted into hash values.

The expiration date setting module 130 is connected to the communication module 135. An accessible deadline is set for information for accessing a content corresponding to an image or content information. For example, when the postcard is a greeting card, January 3 and the like may be used as a default value of the deadline. Up to the deadline, a predetermined fee (including no charge) may be charged, and a fee may be charged when the deadline is extended. The application server 310 is configured to execute fee charging processing. The expiration date setting module 130 is configured to request the application server 310 to extend the deadline through the communication module 135, in accordance with a user's operation. In the meantime, regarding the setting of the accessible deadline, a table in which the information for accessing a content or content information is associated with an accessible deadline is preferably prepared in advance. In the meantime, the information stored in the table may include information (for example, the identification information) for indicating the information for accessing a content or content information, even through the information stored in the table is not the information for accessing a content or content information.

The communication module 135 is connected to the preparation module 120 and the expiration date setting module 130. The communication module 135 is configured to perform communication with the application server 310, a movie distribution service 320 and the like through a communication line.

Figure 2:
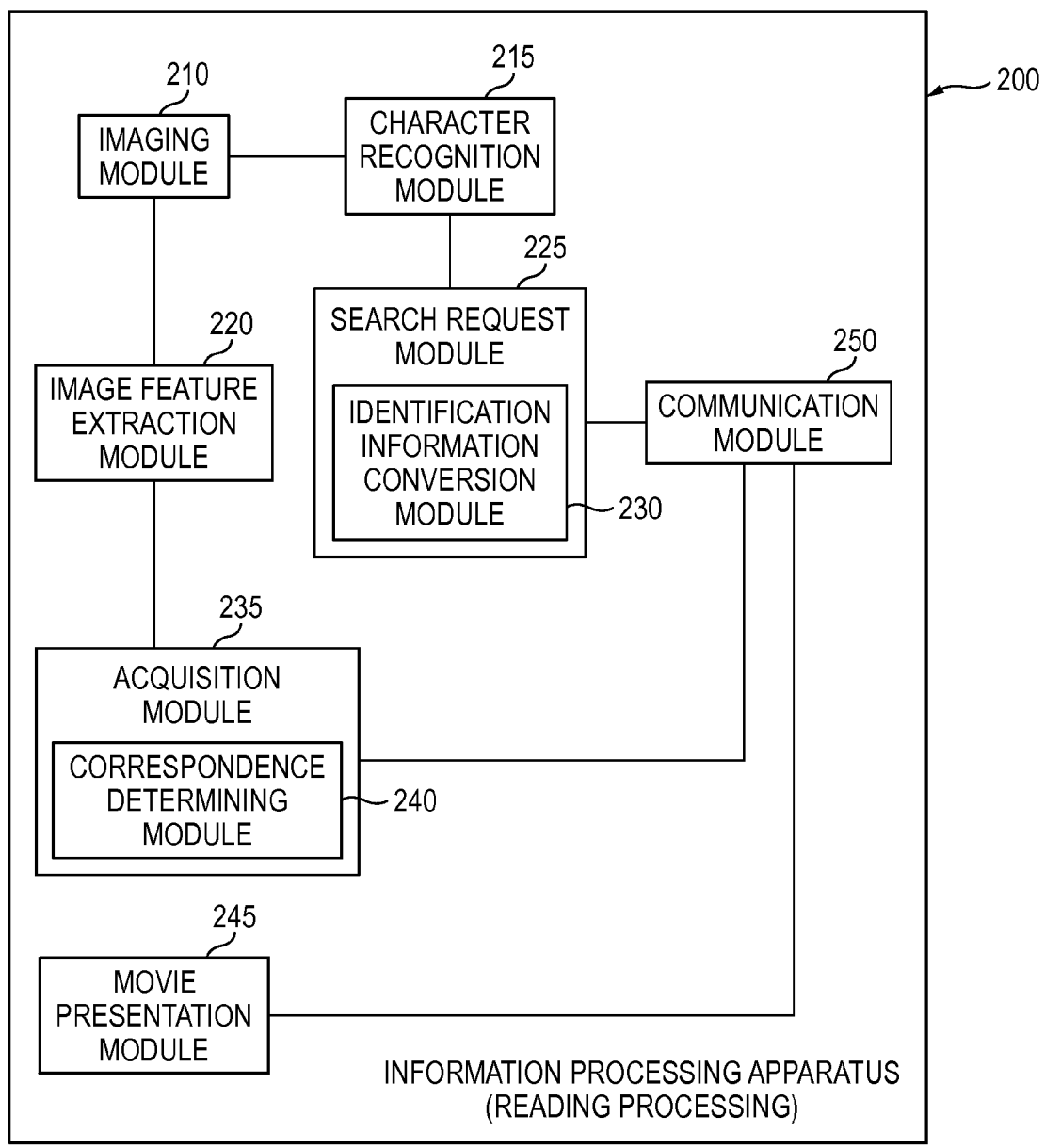
FIG. 2 is a conceptual module configuration view relating to a configuration example of the first illustrative embodiment (information processing apparatus (reading processing))

FIG. 2 is a conceptual module configuration view relating to a configuration example of the first illustrative embodiment (information processing apparatus (reading processing) 200). As shown in FIG. 2, the information processing apparatus (reading processing) 200 includes an imaging module 210, a character identification module 215, an image feature extraction module 220, a search request module 225, an acquisition module 235, a movie presentation module 245, and a communication module 250. The information processing apparatus (reading processing) 200 may be implemented as a portable terminal apparatus, a personal computer and the like having a communication function, for example. In the meantime, the information processing apparatus (reading processing) 200 may be configured in the information processing apparatus (preparation processing) 100. That is, the modules shown in FIGS. 1 and 2 may be included in the information processing apparatus (preparation processing) 100 (information processing apparatus (reading processing) 200).

The information processing apparatus (reading processing) 200 is configured to read the image, which is prepared by the information processing apparatus (preparation processing) 100 and printed on the print medium, with the imaging module 210, and to access a content corresponding to the image. When the content is movie data, a movie is reproduced. In the meantime, the print medium is printed with the identification information, in addition to the image (image selected by the image selection module 110). Also, the information processing apparatus (reading processing) 200 is used to read the identification information printed on the print medium and to limit the content corresponding to the image.

The imaging module 210 is connected to the character identification module 215 and the image feature extraction module 220. The imaging module 210 is configured to capture the image, which is prepared by the information processing apparatus (preparation processing) 100 and printed on the print medium. For example, the imaging module 210 captures a postcard, which has been delivered from a user A (sender) of the information processing apparatus (preparation processing) 100, in accordance with an operation of a user B (receiver). When the information processing apparatus (reading processing) 200 is implemented as a smart phone, a camera provided for the smart phone is preferably used.

The character identification module 215 is connected to the imaging module 210 and the search request module 225. The character identification module 215 is configured to convert the identification information in the image captured by the imaging module 210 into a text code by character identification processing. The identification information is information for identifying a person included in the image captured by the imaging module 210 or a medium having the image printed thereon. When the postcard is a greeting card, the printed identification information may be a zip code, an address, a name and the like of the sender. A printing surface is preferably a backside (a surface on which the image is printed) but may be a surface (a surface on which an address is described). When the printing surface is a backside, it is not necessary to turn over the postcard when capturing the image and the identification information. Here, a well-known technology may be used as regards the character identification processing.

The search request module 225 includes an identification information conversion module 230 and is connected to the character identification module 215 and the communication module 250. The search request module 225 enables the identification information conversion module 230 to convert the identification information character identification-processed by the character identification module 215, and requests the application server 310 to perform a search using the conversion information, through the communication module 250. Here, the 'request for search' is a request for acquiring image feature values having a possibility that it will correspond to the image features extracted by the image feature extraction module 220. Thereby, the correspondence determining module 240 limits a target for which matching processing of the image features is performed. Specifically, it is not necessary to perform the matching processing for all the image feature values registered in the application server 310, and it is sufficient to perform the matching processing only for image feature values of an image registered by an operation of the user A (sender). In response to the request, the acquisition module 235 receives image feature values corresponding to the conversion information, as a research result, from the application server 310 through the communication module 250.

The identification information conversion module 230 is configured to perform the equivalent processing to the identification information conversion module 125 of the information processing apparatus (preparation processing) 100. That is, the identification information conversion module 230 is configured to convert the identification information character identification-processed by the character identification module 215 and to generate the conversion information. For example, the identification information conversion module 230 is configured to perform hash processing for the recognition result (identification information), thereby generating a hash value.

The image feature extraction module 220 is connected to the imaging module 210 and the acquisition module 235. The image feature extraction module 220 is configured to extract the image feature values of the image captured by the imaging module 210. Here, regarding the feature extraction, a well-known technology may be used. In the meantime, the image features may include not only image features (for example, a face image and the like) that can be identified as a feature by a person but also image features required to specify the image.

The acquisition module 235 has the correspondence determining module 240 and is connected to the image feature extraction module 220 and the communication module 250. As described above, the acquisition module 235 is configured to receive the image feature values corresponding to the conversion information, which are requested for search by the search request module 225, as a search result from the application server 310 through the communication module 250. The acquisition module 235 is also configured to enable the correspondence determining module 240 to determine whether the received image feature values A and the image feature values B extracted by the image feature extraction module 220 correspond to each other. When it is determined that they correspond to each other, the acquisition module 235 acquires information for accessing a content corresponding to the image feature values A or content information. Here, the 'information for accessing a content' may be a file name, a URI (Uniform Resource Identifier, including URL (Uniform Resource Locator)) indicating a place where the content is stored, and the like, for example. Also, the acquisition module 235 may acquire the content information itself. In the below (including a second illustrative embodiment), the 'information for accessing a content' will be mainly exemplified. However, when the 'information for accessing a content' is referred to as the 'content information', a case of acquiring the content information is described. In this case, processing of acquiring the content information from the 'information for accessing a content' (specifically, step S812 and step S814 shown in an example of FIG. 8) is not required. Here, regarding the acquisition of the 'information for accessing a content' (hereinafter, also referred to as access information), the access information corresponding to the image feature values A may be received and acquired, or the image feature values A (or the identification information of the image feature values A) corresponding to the image feature values B may be transmitted to the application server 310, and the access information corresponding to the image feature values A may be received from the application server 310.

The correspondence determining module 240 is configured to receive the received image feature values A and the image feature values B extracted by the image feature extraction module 220 from the acquisition module 235 and to determine whether both correspond to each other. Here, the 'corresponding' includes not only a case where both are completely matched but also a case when a difference of both the image feature values is within a predetermined range.

The movie presentation module 245 is connected to the communication module 250. The movie presentation module 245 is configured to acquire a content from the 'information for accessing a content' acquired by the acquisition module 235 and to present the content. When the content is movie data, the movie presentation module 245 reproduces the movie on an output device such as a liquid crystal monitor and the like.

The communication module 250 is connected to the search request module 225, the acquisition module 235 and the movie presentation module 245. The communication module 250 is configured to perform communication with the application server 310, a movie distribution service 320 and the like, which will be described later, through the communication line.

Figure 3:
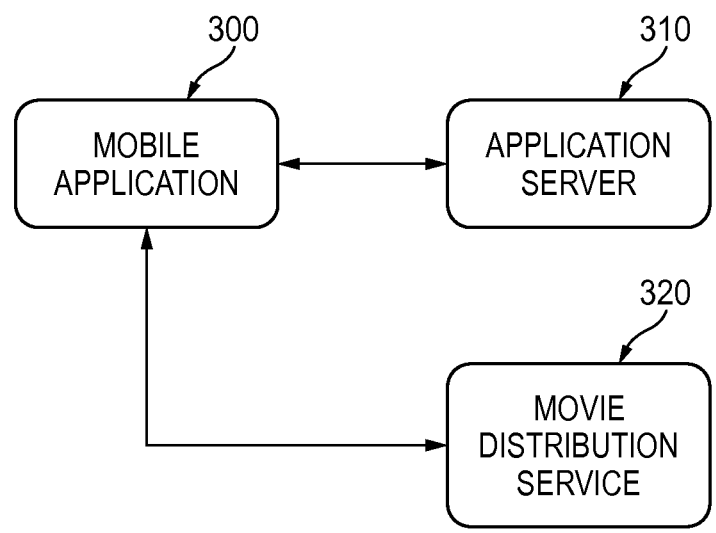
FIG. 3 illustrates an example of a system configuration (software standpoint) using the illustrative embodiment.

FIG. 3 illustrates an example of a system configuration (software standpoint) using the illustrative embodiment.

A mobile application 300 is connected in communication with the application server 310 and the movie distribution service 320, and has the functions of the information processing apparatus (preparation processing) 100 or information processing apparatus (reading processing) 200. Specifically, the mobile application 300 is configured to perform the processing of preparing a postcard or processing of reproducing a movie from the postcard.

The application server 310 is connected to the mobile application 300. The application server 310 is configured to manage the postcard data. Specifically, the application server 310 is configured to manage the sender information (which may also be the identification information of a zip code, an address, a name and the like of a sender becoming targets of the hash function, as described above), which is the hash values (conversion information) of a zip code, an address, a name and the like of a sender, image feature values of a postcard image, a URL (a storage place of a movie relating to a postcard image) of the movie data, an expiration date, and the like. Here, the management is processing of associating the information each other and storing, like a postcard information table 900 shown in FIG. 9 (which will be described later), and extracting the information such as the image feature values in correspondence to the conversion information (or identification information). The application server 310 is configured to receive the search request using the conversion information (or the identification information before conversion, as described above) obtained by converting the identification information for identifying a person printed on a medium or a medium having an image printed thereof, from the information processing apparatus (reading processing) 200. The application server 310 is configured to search the image feature values stored in the postcard information table 900 by using the conversion information (or identification information, when the identification information is received). As a result of the search in response to the search request, the application server 310 is configured to transmit the image feature values corresponding to the conversion information (the identification information, when the identification information is received) to the mobile application 300.

The movie distribution service 320 is connected to the mobile application 300. The movie distribution service 320 is configured to manage and transmit the content. Specifically, the movie distribution service 320 is configured to transfer the movie data to the mobile application 300, and the mobile application 300 is configured to reproduce the movie.

Figure 4:
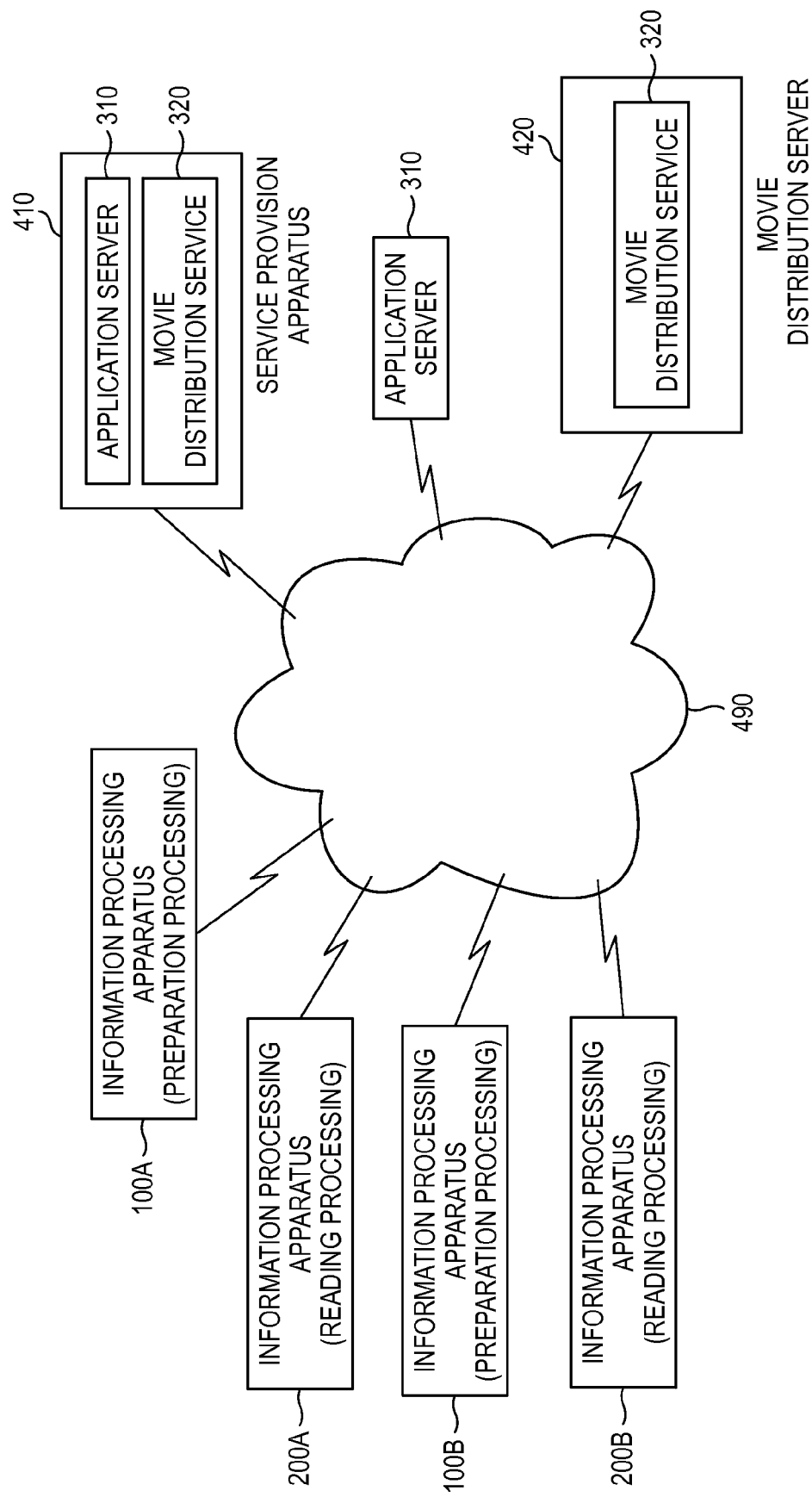
FIG. 4 illustrates an example of a system configuration (hardware standpoint) using the illustrative embodiment.

FIG. 4 illustrates an example of a system configuration (hardware standpoint) using the illustrative embodiment.

An information processing apparatus (preparation processing) 100A, an information processing apparatus (preparation processing) 100B, an information processing apparatus (reading processing) 200A, an information processing apparatus (reading processing) 200B, the application server 310, a service provision apparatus 410, and a movie distribution server 420 are connected through a communication line 490. The communication line 490 may be a wired line, a wireless line or a combination thereof, and may be the Internet serving as a communication infrastructure, for example.

In the meantime, the application server 310 and the movie distribution service 320 may be individually configured as the application server 310 as a hardware configuration and the movie distribution server 420 having the movie distribution service 320 mounted thereto, or may be configured as the service provision apparatus 410 having both the application server 310 and the movie distribution service 320 mounted thereon.

Figure 5:
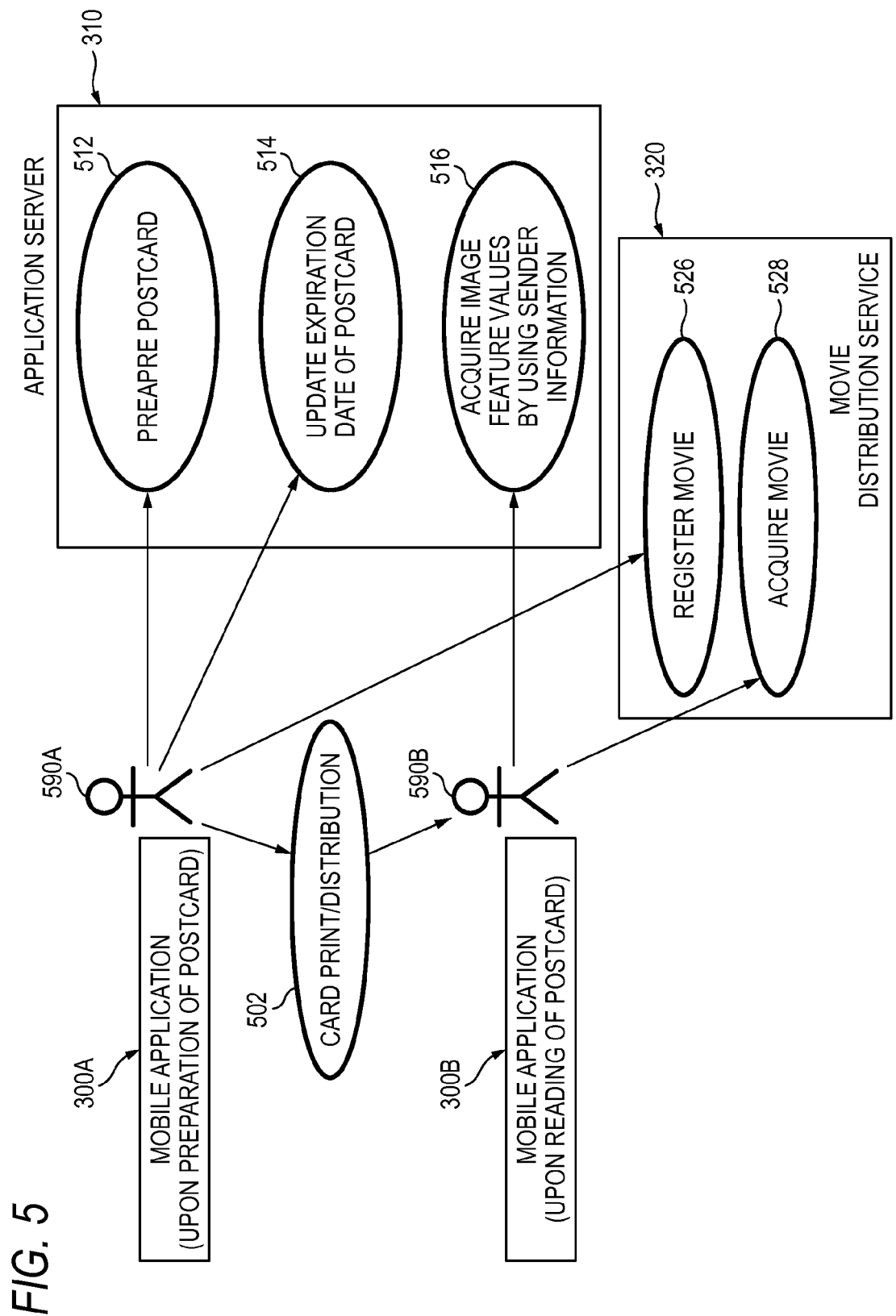
FIG. 5 illustrates a use case example using the illustrative embodiment.

FIG. 5 illustrates a use case example using the illustrative embodiment. As an example of a so-called operation string specification, the first illustrative embodiment may be executed, and a modified example where it is possible to interact with a user 590A or user 590B is included.

The user 590A is a person who prepares a postcard. The user 590B is a person who receives the postcard and is presented with a content from an image printed on the postcard.

In response to an operation of the user 590A, a mobile application (upon preparation of a postcard) 300A enables the application server 310 to execute processing 512 and processing 514, and enables the movie distribution service 320 to execute processing 526. In processing 502, a printer is enabled to print a postcard and the postcard is distributed (delivered).

In response to an operation of the user 590B who has received the postcard, a mobile application (upon reading of a postcard) 300B enables the application server 310 to execute processing 516, and enables the movie distribution service 320 to execute processing 528.

In the meantime, the respective processing is as follows. In the processing 512, a postcard is prepared. In the processing 514, an expiration date of the postcard is updated. In the processing 516, image feature values are acquired using the sender information. In the processing 502, the postcard is printed and distributed. In the processing 526, a movie is registered. In the processing 528, the movie is acquired.

Figure 6:
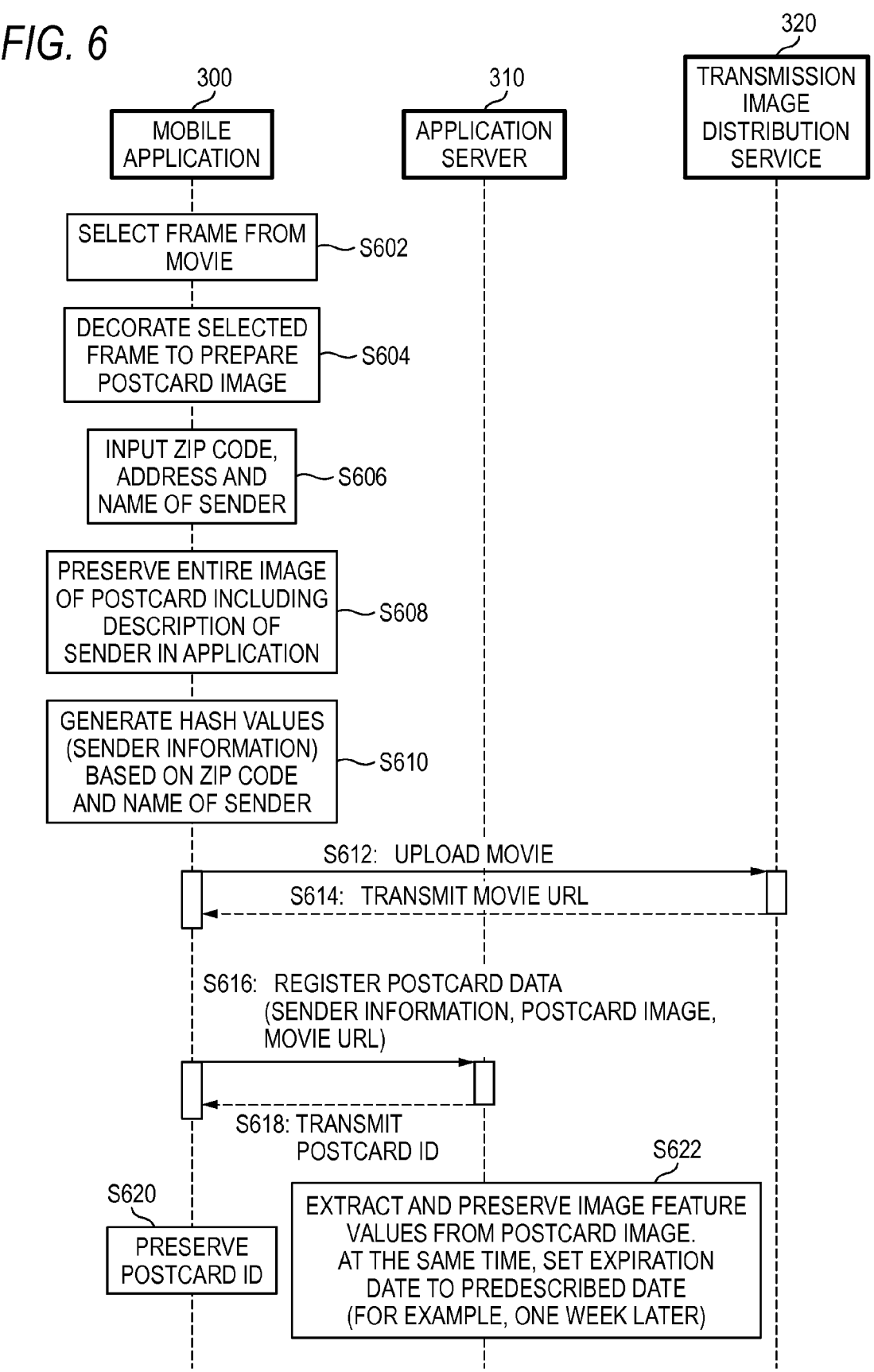
FIG. 6 is a flowchart showing a processing example of the first illustrative embodiment.

FIG. 6 is a flowchart showing a processing example of the first illustrative embodiment, which is executed by an instruction from the user A who prepares a postcard. Here, the mobile application 300 is configured in the information processing apparatus (preparation processing) 100 of the user A.

In step S602, the image selection module 110 of the mobile application 300 enables the user A to select a frame from the movie. In this example, a frame image in the movie is used as an image to be printed to the postcard. In the meantime, it is assumed that the movie has been already selected by the movie selection module 115.

In step S604, the preparation module 120 of the mobile application 300 decorates the selected frame to prepare a postcard image. For example, when the postcard is a greeting card, the preparation module 120 performs an editing of adding characters such as 'New Year's greetings' for the image.

In step S606, the preparation module 120 of the mobile application 300 inputs a zip code, an address and a name of the sender.

In step S608, the preparation module 120 of the mobile application 300 preserves an entire image of the postcard including the description of the sender in an application. Here, the 'entire image of the postcard' includes the decorated image, and the zip code, the address and the name of the sender.

In step S610, the identification information conversion module 125 of the mobile application 300 generates hash values (sender information) on the basis of the zip code and the name of the sender.

In step S612, the mobile application 300 uploads the movie to the movie distribution service 320.

In step S614, the movie distribution service 320 transmits a movie URL to the mobile application 300. That is, when accessing the movie URL, it is possible to reproduce the movie uploaded in step S612.

In step S616, the mobile application 300 registers the postcard data (the sender information, postcard image and movie URL) in the application server 310. The application server 310 manages the corresponding data by the postcard information table 900, for example. FIG. 9 shows an example of a data structure of the postcard information table 900. The postcard information table 900 has a postcard ID field 910, an identification information (hash value) field 920, image feature values field 930, an expiration date field 940, and a movie URL field 950. In this illustrative embodiment, the postcard ID field 910 stores therein information (postcard ID: IDentification) for uniquely identifying a postcard. The identification information (hash value) field 920 stores therein identification information (hash value), which is the sender information corresponding to the postcard ID. The image feature values field 930 stores therein image feature values corresponding to the postcard ID. The expiration date field 940 stores therein an expiration date corresponding to the postcard ID. The movie URL field 950 stores therein a movie URL corresponding to the postcard ID. The sender information and movie URL received in step S616 are respectively stored in the identification information (hash value) field 920 and the movie URL field 950. A postcard ID indicating a combination thereof is generated and stored in the postcard ID field 910.

In step S618, the application server 310 transmits the postcard ID, which indicates a set of the data received in step S616, to the mobile application 300.

In step S620, the mobile application 300 preserves the postcard ID.

In step S622, the application server 310 extracts the image feature values from the postcard image (or image in the postcard) and preserves the same in the image feature values field 930 of the postcard information table 900. At the same time, the expiration date is set to a prescribed value (predetermined value (default value), for example, one week later). In the meantime, a change of the expiration date will be described later with reference to an example of FIG. 7.

Then, the prepared postcard is printed and delivered to the user B.

Figure 7:
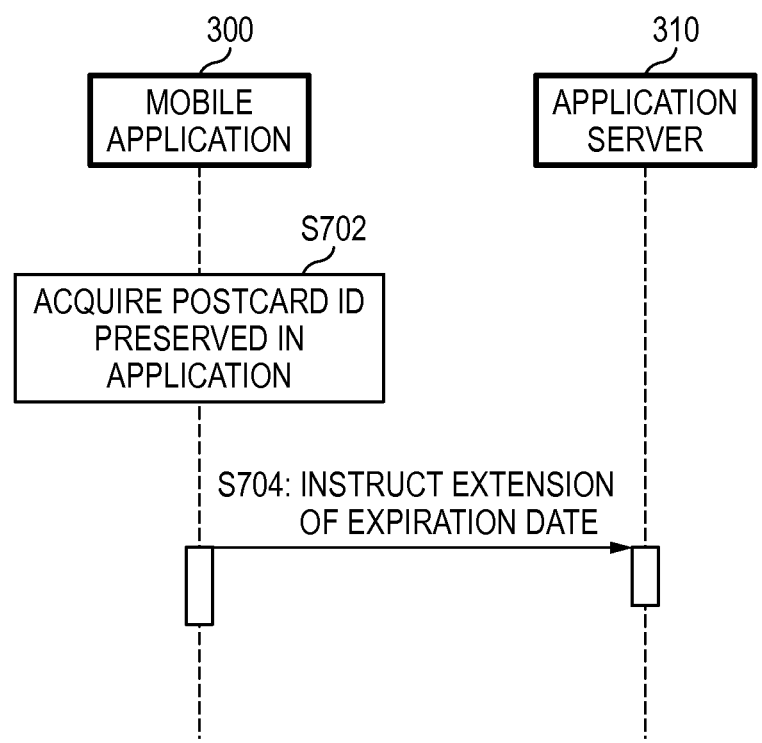
FIG. 7 is a flowchart showing a processing example of the first illustrative embodiment.

FIG. 7 is a flowchart showing a processing example of the first illustrative embodiment, which is executed by an instruction of the user A. Here, the mobile application 300 is configured in the information processing apparatus (preparation processing) 100 of the user A.

In step S702, the mobile application 300 acquires the postcard ID preserved in the application.

In step S704, the mobile application 300 instructs the application server 310 to extend the expiration date corresponding to the postcard ID. The application server 310 executes the charging processing in correspondence to the extension of the deadline. That is, the application server 310 charges a fee in accordance with a predetermined rule. For example, the application server 310 charges a fee calculated by multiplying an extended time period by a fee of a unit time period (one day, for example), or charges a fee in accordance with the past using history of the user of the mobile application 300.

Figure 8:
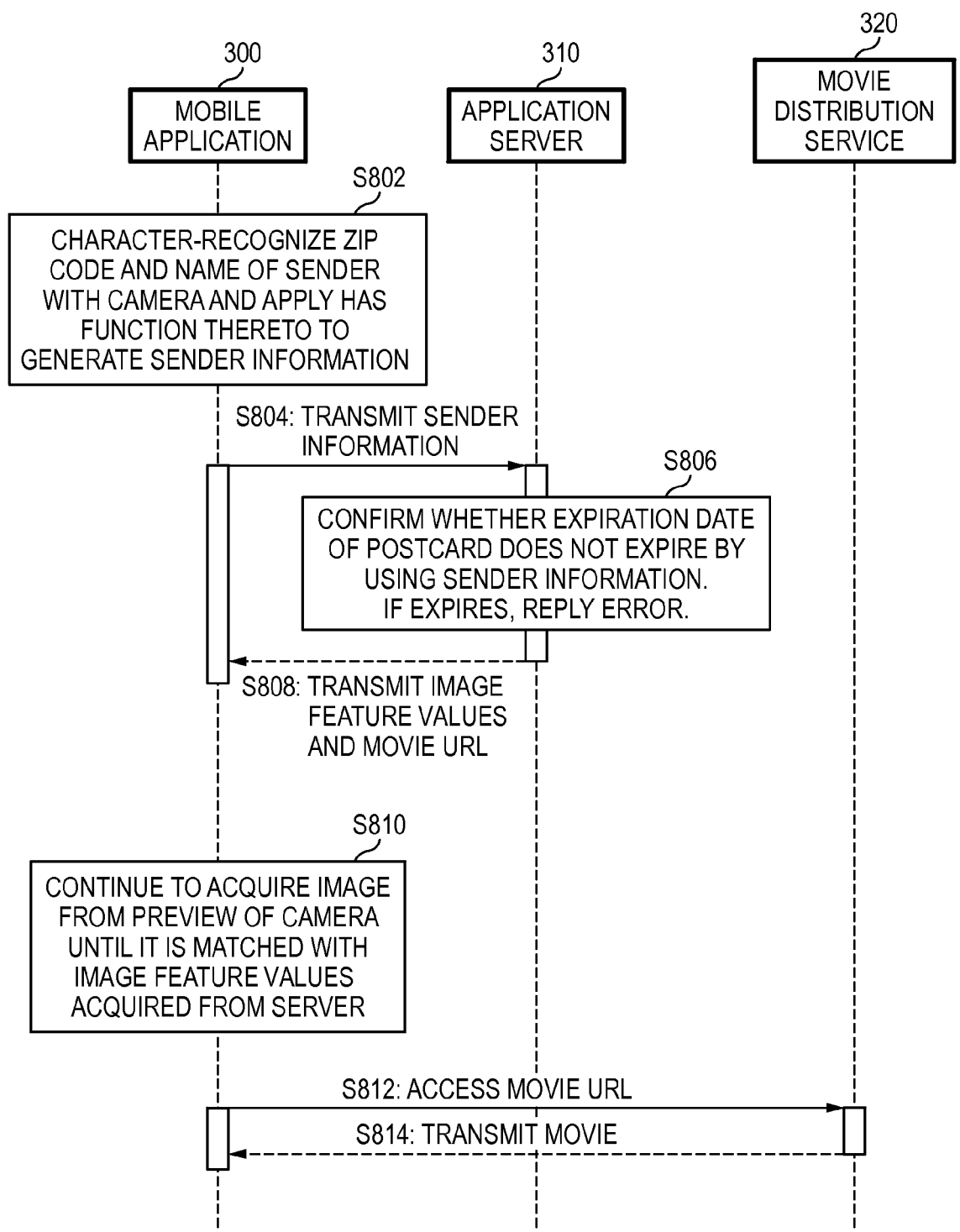
FIG. 8 is a flowchart showing a processing example of the first illustrative embodiment.

FIG. 8 is a flowchart showing a processing example of the first illustrative embodiment, which is executed by an instruction of the user B who has received the postcard. Here, the mobile application 300 is configured in the information processing apparatus (reading processing) 200 of the user B.

In step S802, the imaging module 210 of the mobile application 300 captures the zip code and name of the sender with a camera, the character identification module 215 character-identifies the captured image, and the identification information conversion module 230 applies a hash function thereto to generate the sender information.

In step S804, the search request module 225 of the mobile application 300 transmits the sender information to the application server 310, as the search request.

In step S806, the application server 310 confirms whether the expiration date of the postcard having the sender information does not expire (within the expiration date). If the expiration date expires, an error is replied. Specifically, the expiration date field 940 corresponding to the sender information in the postcard information table 900 is referred to for the determination.

In step S808, if within the expiration date, the application server 310 transmits the image feature values and movie URL to the mobile application 300. Specifically, a combination of the image feature values field 930 and the movie URL field 950 in the postcard information table 900 is transmitted.

In step S810, the mobile application 300 continues to acquire an image from a preview of the camera until it is matched with the image feature values acquired from the application server 310 in step S808. That is, the imaging module 210 captures the image printed on the postcard, and the image feature extraction module 220 extracts the image features from the image. In the meantime, the capturing may include pressing a shutter or storing an image in a memory (which is referred to as preview). That is, the capturing may be performed so that the image feature extraction module 220 can extract the image features. Then, the correspondence determining module 240 determines whether the feature amount of the captured image is matched with the image feature values acquired from the application server 310. If they are matched, the processing proceeds to step S812. In the meantime, as described above, the match may include not only a case where both are completely matched but also a case when a difference of both the image feature values is within a predetermined range.

In step S812, the movie presentation module 245 of the mobile application 300 accesses the movie URL corresponding to the image feature values matched in step S810, in the movie distribution service 320.

In step S814, the movie distribution service 320 transmits the movie to the mobile application 300. Thereafter, the movie presentation module 245 of the mobile application 300 reproduces the movie.

Figure 10:
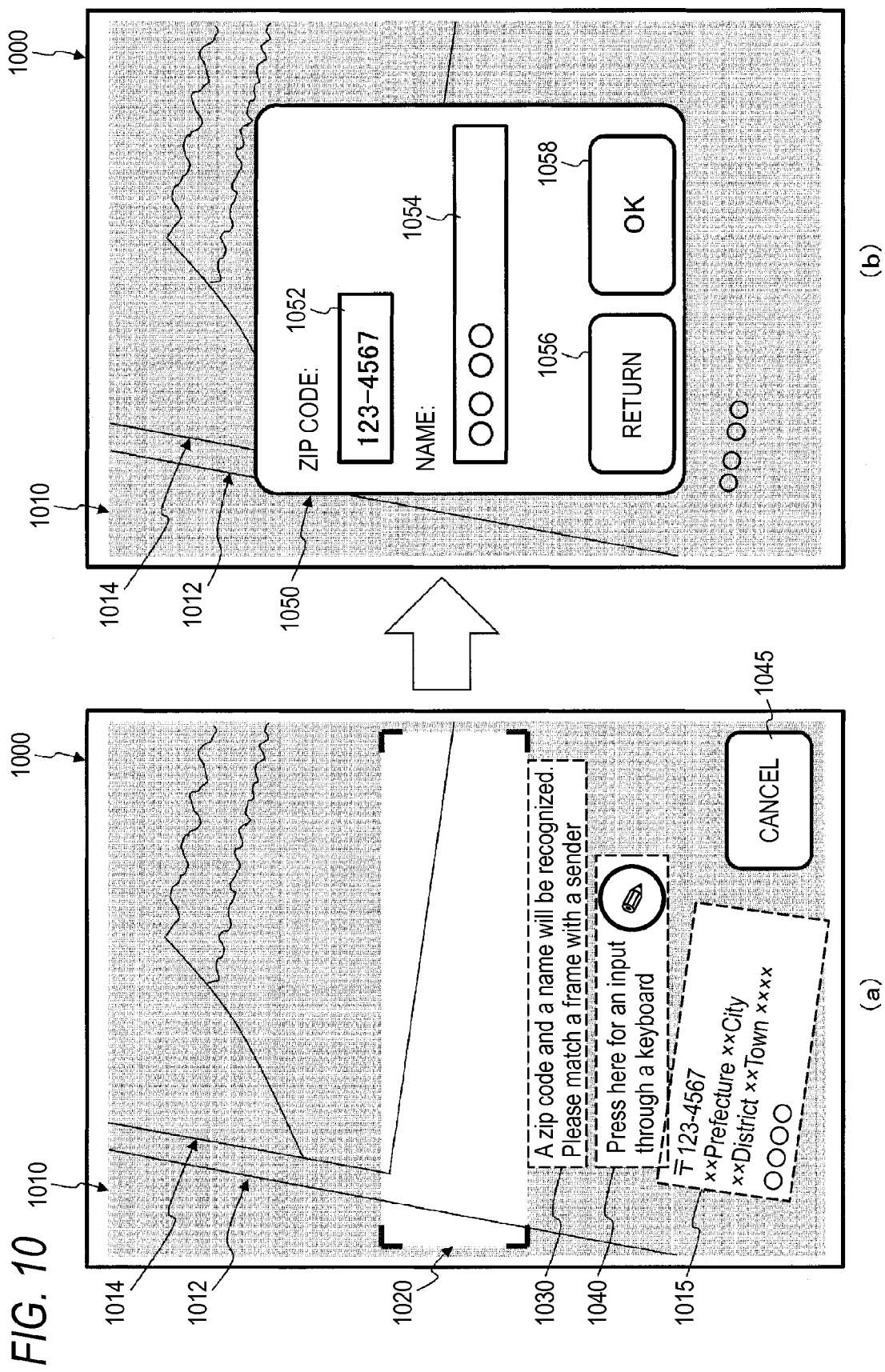
FIG. 10 illustrates a processing example of the first illustrative embodiment.

FIG. 10 illustrates a processing example (a processing example of step S802 in the flowchart shown in FIG. 8) of the first illustrative embodiment. A postcard 1012 is printed thereon with a design image 1014 and a sender information description area 1015.

In the example shown in FIG. 10A, a captured image 1010 of the postcard 1012 is displayed on a screen 1000 of a display device such as a liquid crystal monitor provided for the information processing apparatus (reading processing) 200, and an operation screen for setting the sender information description area 1015 as a target of the character identification is shown. A recognition area setting frame 1020, a message area 1030 ('A zip code and a name will be recognized. Please match a frame (recognition area setting frame 1020) with a sender'), a message area 1040 (Press this for an input through a keyboard') are displayed. The user B adjusts a position of the camera (or main body of the information processing apparatus (reading processing) 200) so that the sender information description area 1015 is matched with the recognition area setting frame 1020. Also, when interrupting the movie presentation processing, a cancel button 1045 is selected. In the meantime, a display where an image being captured (captured image 1010) is set as a background and the recognition area setting frame 1020 and the like are set as a foreground is shown.

In the example shown in FIG. 10B, an image character identification result is displayed in the recognition area setting frame 1020. In this display, when a confirmation degree, which is the character identification result, is equal to or greater than a predetermined threshold, a confirmation dialogue is displayed.

A sender information recognition result display area 1050 has a zip code field 1052, which indicates a character identification result of the zip code, a name field 1054, which indicates a character identification result of the name, a return button 1056 for re-executing the character identification (or setting of the recognition area), and an OK button 1058, which indicates that a character identification result is right. When the OK button 1058 is selected, the hash function is applied to values in the zip code field 1052 and the name field 1054, so that the sender information is generated and transmitted to the application server 310 (step S804). Then, a combination of the image feature values corresponding to the sender information and the movie URL is received by the information processing apparatus (reading processing) 200 (step S808).

Figure 11:
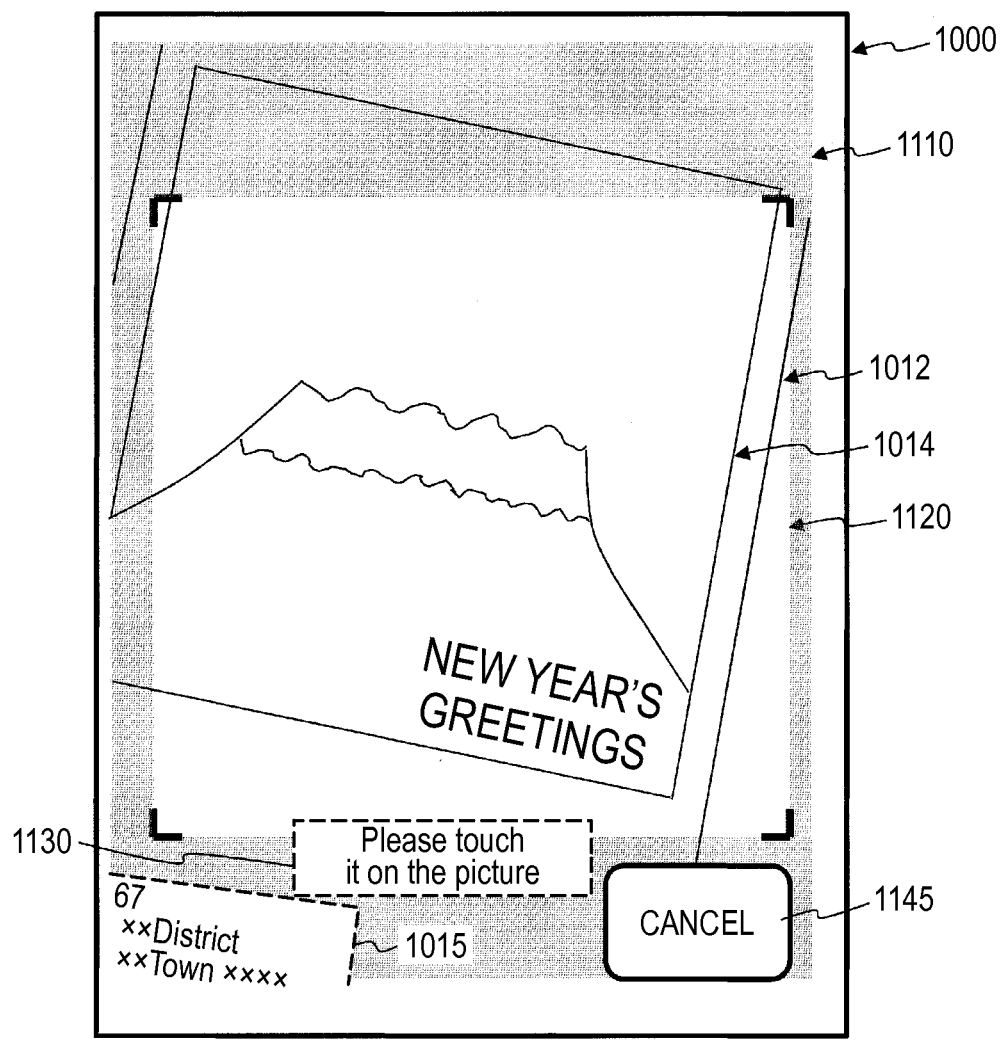
FIG. 11 illustrates a processing example of the first illustrative embodiment.

FIG. 11 illustrates a processing example (a processing example of step S810 in the flowchart shown in FIG. 8) of the first illustrative embodiment.

A screen 1000 shown in FIG. 11 indicates an operation screen for setting the design image 1014 as a target of the image feature extraction, and displays an image feature extraction setting frame 1120 and a message area 1130 (Please touch it on the picture'). The user B adjusts a position of the camera (or main body of the information processing apparatus (reading processing) 200) so that the design image 1014 is matched with the image feature extraction setting frame 1120. Also, when interrupting the content presentation processing, a cancel button 1145 is selected. The image feature extraction module 220 extracts the image features in the image feature extraction setting frame 1120. When the extracted image feature values are matched with the image feature values received from the application server 310, the image URL corresponding to the image feature values is accessed, and the movie is acquired and reproduced.

Second Illustrative Embodiment

Figure 12:
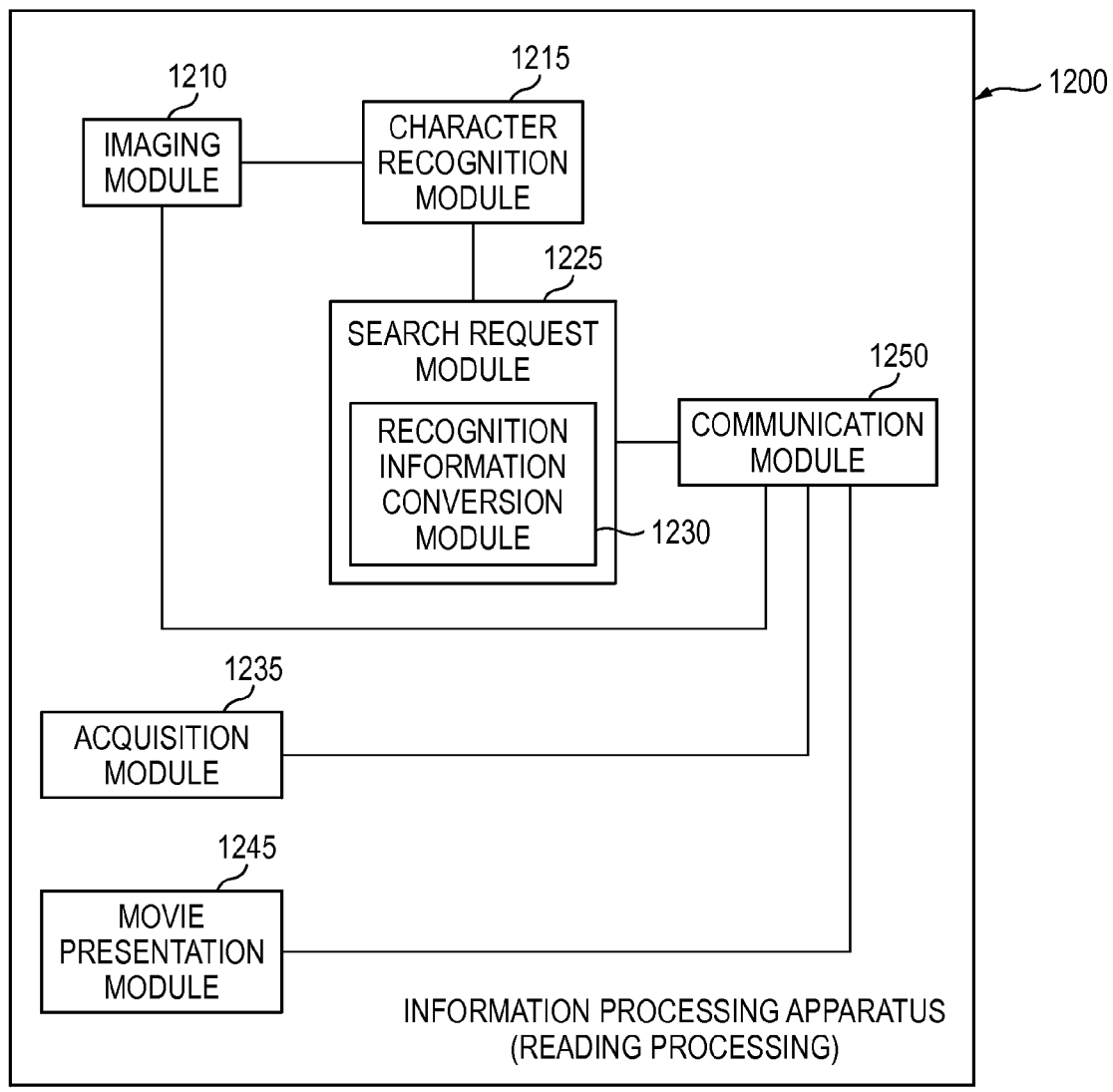
FIG. 12 is a conceptual module configuration view relating to a configuration example of a second illustrative embodiment (information processing apparatus (reading processing))

FIG. 12 is a conceptual module configuration view relating to a configuration example of a second illustrative embodiment (information processing apparatus (reading processing) 1200). In the first illustrative embodiment, the information processing apparatus (reading processing) 200 is configured to extract the image features and to perform the correspondence determination. However, in the second illustrative embodiment, an information processing apparatus (application server) 1300 (corresponding to the application server 310) is configured to extract the image features and to perform the correspondence determination. In the meantime, also in the second illustrative embodiment, the equivalent configurations to the information processing apparatus (preparation processing) 100 and movie distribution service 320 of the first illustrative embodiment are used.

The information processing apparatus (reading apparatus) 1200 corresponds to the information processing apparatus (reading processing) 200 of the first illustrative embodiment, and includes an imaging module 1210, a character identification module 1215, a search request module 1225, an acquisition module 1235, a movie presentation module 1245, and a communication module 1250. The modules corresponding to the first illustrative embodiment are respectively described.

The imaging module 1210 is connected to the character identification module 1215 and the communication module 1250. The imaging module 1210 is configured to execute the equivalent processing to the imaging module 210. An image captured by the imaging module 1210 is transmitted to the information processing apparatus (application server) 1300 through the communication module 1250. This is to enable the information processing apparatus (application server) 1300 to extract image features.

The character identification module 1215 is connected to the imaging module 1210 and the search request module 1225. The character identification module 1215 is configured to execute the equivalent processing to the character identification module 215.

The search request module 1225 has an identification information conversion module 1230 and is connected to the character identification module 1215 and the communication module 1250. The search request module 1225 is configured to execute the equivalent processing to the search request module 225. The identification information conversion module 1230 is configured to execute the equivalent processing to the identification information conversion module 230.

In the meantime, the reason that the information processing apparatus (reading apparatus) 1200 is also configured to perform the character identification processing and to convert the character identification result to generate the conversion information is not to transmit the identification information (the recognition result, the image having the identification information described therein), which has a possibility that it will be the personal information, as it is.

The acquisition module 1235 is connected to the communication module 1250. The acquisition module 1235 is configured to receive a movie URL from the information processing apparatus (application server) 1300 through the communication module 1250. That is, when the image feature values corresponding to the conversion information (or identification information) and the image feature values extracted from the image captured by the imaging module 1210 correspond to each other, the information for accessing a content is acquired, as a search result. In the meantime, the determination as to whether the 'image feature values corresponding to the conversion information (or identification information) and the image feature values extracted from the image captured by the imaging module 1210 correspond to each other' is performed by the information processing apparatus (application server) 1300.

The movie presentation module 1245 is connected to the communication module 1250. The movie presentation module 1245 is configured to execute the equivalent processing to the movie presentation module 245. Specifically, the movie presentation module 1245 is configured to access the movie URL received by the acquisition module 1235 and to reproduce the movie.

The communication module 1250 is connected to the imaging module 1210, the search request module 1225, the acquisition module 1235, and the movie presentation module 1245. The communication module 1250 is configured to execute the equivalent processing to the communication module 250.

Figure 13:
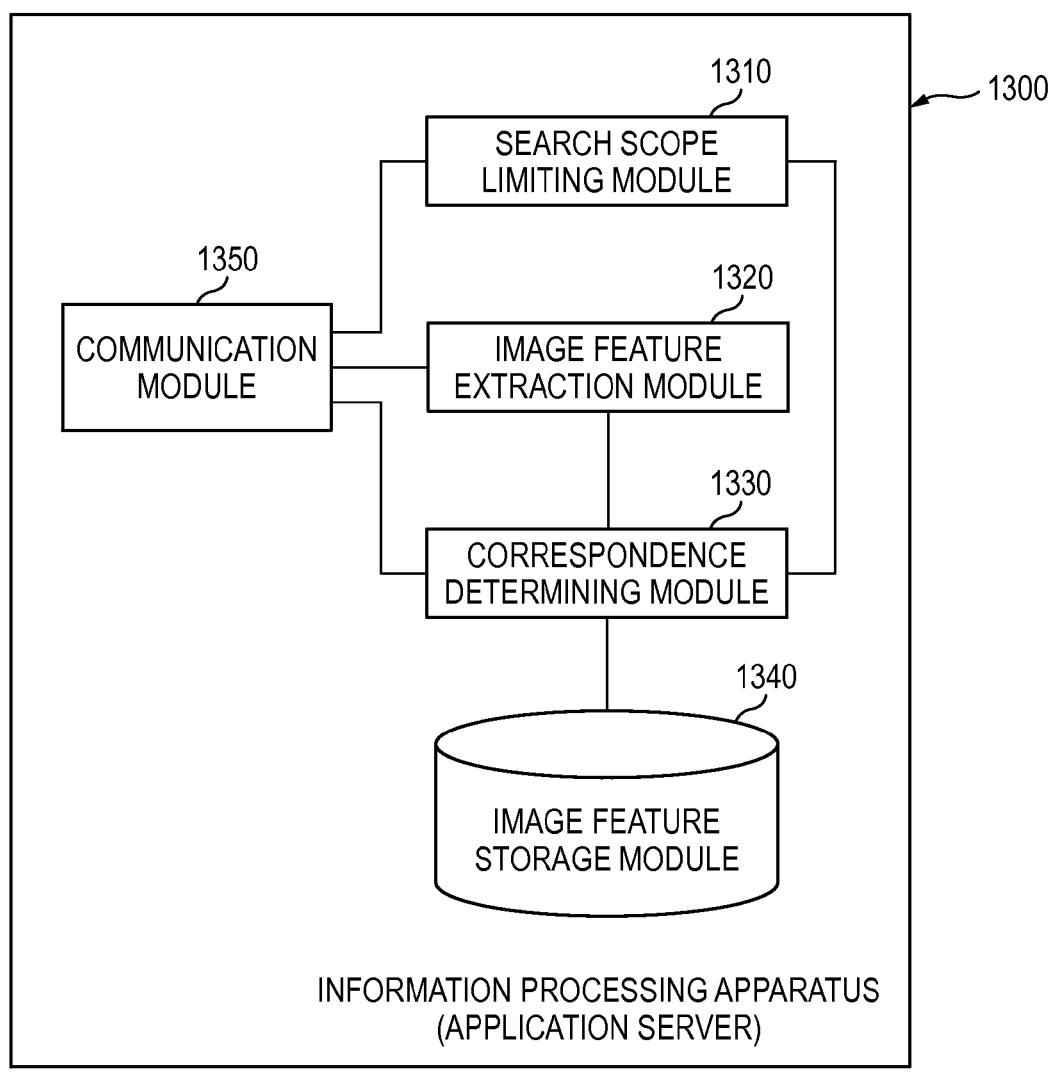
FIG. 13 is a conceptual module configuration view relating to a configuration example of the second illustrative embodiment (information processing apparatus (application server))

FIG. 13 is a conceptual module configuration view relating to a configuration example of the second illustrative embodiment (information processing apparatus (application server) 1300).

The information processing apparatus (application server) 1300 corresponds to the application server 310 of the first illustrative embodiment, and includes a search scope limiting module 1310, an image feature extraction module 1320, a correspondence determining module 1330, an image feature storage module 1340, and a communication module 1350.

The search scope limiting module 1310 is connected to the correspondence determining module 1330 and the communication module 1350. The search scope limiting module 1310 is configured to receive a search request using the conversion information (as described above, the identification information, when the identification information is received) obtained by converting the identification information for identifying a person described in an image or a medium having an image printed thereon, from the information processing apparatus (reading apparatus) 1200. The search scope limiting module 1310 is configured to instruct the correspondence determining module 1330 so that the image feature values are limited to correspond to the conversion information (the identification information, when the identification information is received) so as to execute corresponding processing of the image features. Here, the limiting processing is to search the image feature values stored in the image feature storage module 1340 by using the conversion information (the identification information, when the identification information is received). The correspondence determining module 1330 is configured to execute the corresponding processing within the scope of the search result.

The image feature extraction module 1320 is connected to the correspondence determining module 1330 and the communication module 1350. The image feature extraction module 1320 is configured to receive an image from the information processing apparatus (reading apparatus) 1200 and to extract a feature of the image.

The correspondence determining module 1330 is connected to the search scope limiting module 1310, the image feature extraction module 1320, the image feature storage module 1340, and the communication module 1350. When the image feature values (the image feature values stored in the image feature values storage module 1340 and limited to correspond to the conversion information (the identification information, when the identification information is received) by the search scope limiting module 1310) corresponding to the conversion information (the identification information, when the identification information is received) and the image feature values extracted from the image by the image feature extraction module 1320 correspond to each other, the correspondence determining module 1330 transmits the information for accessing a content to the information processing apparatus (reading apparatus) 1200 through the communication module 1350, as a search result in response to the search request.

The image feature storage module 1340 is connected to the correspondence determining module 1330. The image feature storage module 1340 is configured to store the feature amount of the image prepared by the information processing apparatus (preparation processing) 100. For example, as described above, the image feature storage module 1340 may be configured to store the postcard information table 900 shown in FIG. 9.

The communication module 1350 is connected to the search scope limiting module 1310, the image feature extraction module 1320 and the correspondence determining module 1330. The communication module 1350 is configured to perform communication with the information processing apparatus (preparation processing) 100, the information processing apparatus (reading apparatus) 1200 and the like through the communication line.

Figure 14:
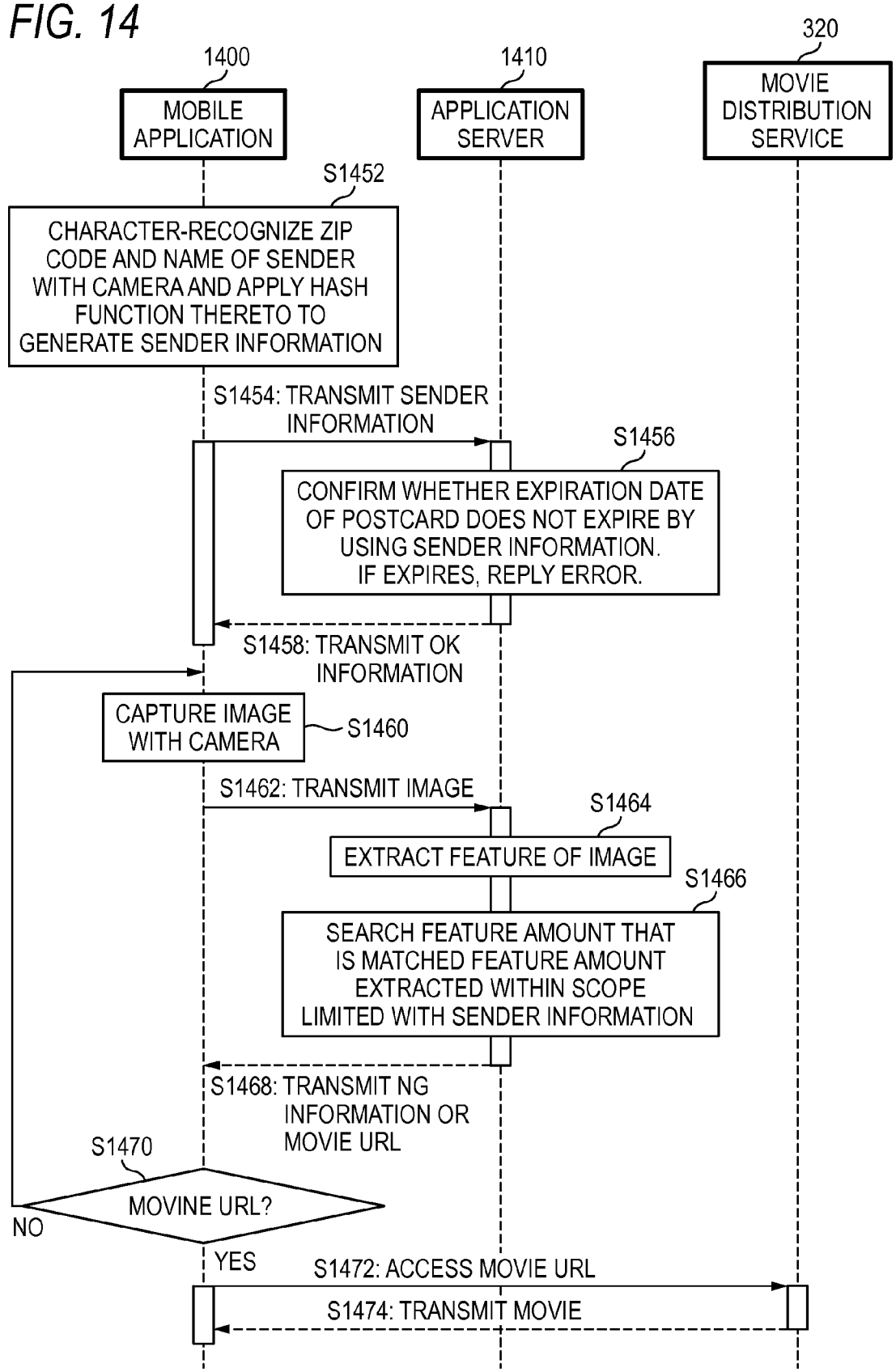
FIG. 14 is a flowchart showing a processing example of the second illustrative embodiment.

FIG. 14 is a flowchart showing a processing example of the second illustrative embodiment. This corresponds to the flowchart shown in the example of FIG. 8 of the first illustrative embodiment. Here, a mobile application 1400 is configured in the information processing apparatus (reading apparatus) 1200 of the user B, and an application server 1410 is configured in the information processing apparatus (application server) 1300.

In step S1452, the imaging module 1210 of the mobile application 1400 captures a zip code and a named of the sender with the camera, the character identification module 1215 character-identifies the captured image, and the identification information conversion module 1230 applies the hash function thereto to generate the sender information.

In step S1454, the search request module 1225 of the mobile application 1400 transmits the sender information to the application server 1410, as a search request.

In step S1456, the application server 1410 confirms whether the expiration date of the postcard having the sender information does not expire (within the expiration date). If the expiration date expires, an error is replied. Specifically, the expiration date field 940 corresponding to the sender information in the postcard information table 900 is referred to for the determination.

In step S1458, if within the expiration date, the application server 1410 transmits the OK information to the mobile application 1400.

In step S1460, the imaging module 1210 of the mobile application 1400 captures an image with the camera.

In step S1462, the communication module 1250 of the mobile application 1400 transmits the image captured in step S1460 to the application server 1410.

In step S1464, the image feature extraction module 1320 of the application server 1410 extracts a feature of the image received in step S1462.

In step S1466, the correspondence determining module 1330 of the application server 1410 searches a feature amount that is matched with the feature amount extracted within the scope limited with the sender information by the search scope limiting module 1310.

In step S1468, the correspondence determining module 1330 of the application server 1410 transmits the NG information or movie URL to the mobile application 1400.

In step S1470, the acquisition module 1235 of the mobile application 1400 determines whether the transmitted information is a movie URL. When the information is the movie URL, the processing proceeds to step S1472. Otherwise (when the NG information is received in step S1468), the processing returns to step S1460.

In step S1472, the movie presentation module 1245 of the mobile application 1400 accesses to the movie URL received in step S1468 in the movie distribution service 320.

In step S1474, the movie distribution service 320 transmits the movie to the mobile application 1400. Thereafter, the movie is reproduced with the movie presentation module 1245 of the mobile application 1400.

A hardware configuration example of the information processing apparatus (the information processing apparatus (preparation processing) 100, the information processing apparatus (reading processing) 200, the application server 310, the service provision apparatus 410, the movie distribution server 420, the information processing apparatus (reading apparatus) 1200, and the information processing apparatus (application server) 1300) of this illustrative embodiment is described with reference to FIG. 15. The configuration shown in FIG. 15 shows a hardware configuration example that is configured by a personal computer (PC), for example, and has a data reading unit 1517 such as a scanner, a camera and the like and a data output unit 1518 such as a printer and the like. In the meantime, when the hardware configuration is configured as a portable terminal apparatus, the printer and the like may not be connected.

A CPU (Central Processing Unit) 1501 is a control unit configured to execute processing in accordance with a computer program describing execution sequences of the various modules in the above illustrative embodiments, i.e., the image selection module 110, the movie selection module 115, the preparation module 120, the identification information conversion module 125, the expiration date setting module 130, the communication module 135, the imaging module 210, the character identification module 215, the image feature extraction module 220, the search request module 225, the identification information conversion module 230, the acquisition module 235, the correspondence determining module 240, the movie presentation module 245, the communication module 250, the mobile application 300, the movie distribution service 320, the imaging module 1210, the character identification module 1215, the search request module 1225, the identification information conversion module 1230, the acquisition module 1235, the movie presentation module 1245, the communication module 1250, the search scope limiting module 1310, the image feature extraction module 1320, the correspondence determining module 1330, the communication module 1350 and the like.

A ROM (Read Only Memory) 1502 is configured to store therein programs, operational parameters and the like, which are used by the CPU 1501. A RAM (Random Access Memory) 1503 is configured to store therein programs, which are used upon execution of the CPU 1501, parameters, which are appropriately changed upon the execution, and the like. The ROM and the RAM are connected to each other by a host bus 1504 configured by a CPU bus and the like.

The host bus 1504 is connected to an external bus 1506 such as a PCI (Peripheral Component Interconnect/Interface) bus through a bridge 1505.

A keyboard 1508, and a pointing device 1509 such as a mouse are input devices that are operated by a user. A display 1510 includes a liquid crystal display apparatus, a CRT (Cathode Ray Tube) and the like, and is configured to display a variety of information as text and image information.

An HDD (Hard Disk Drive) 1511 is configured to embed a hard disk, to drive the hard disk and to record or reproduce a program or information, which is executed by the CPU 1501. The hard disk is configured to store therein the captured image, the movie, the postcard information table 900 and the like and to implement the functions as the image feature storage module 1340 and the like. Further, a variety of computer programs such as the other various data processing programs are stored therein.

A drive 1512 is configured to read out data or program recorded in a mounted removable recording medium 1513 such as a magnetic disk, an optical disk, an optical magnetic disk or a semiconductor memory and to supply the data or program to the RAM 1504 connected via an interface 1507, the external bus 1506, the bridge 1505 and the host bus 1504. The removable recording medium 1513 can also be used as the same data recording area as the hard disk.

A connection port 1514 is a port for connecting an external connection device 1515, and has a connection unit such as a USB, IEEE1394 and the like. The connection port 1514 is connected to the CPU 1501 and the like through the interface 1507, the external bus 1506, the bridge 1505, the host bus 1504 and the like. A communication unit 1516 is connected to the communication line and is configured to execute data communication processing with the outside. A data reading unit 1517 is a camera or a scanner, for example, and is configured to execute document reading processing. A data output unit 1518 is a printer, for example, and is configured to execute output processing of document data.

In the meantime, the hardware configuration shown in FIG. 15 shows one configuration example, this illustrative embodiment is not limited to the configuration shown in FIG. 15, and any configuration capable of executing the modules described in this illustrative embodiment can be used. For example, a part of the modules may be configured as a dedicated hardware configuration (for example, Application Specific Integrated Circuit (ASIC) and the like), a part of the module may be configured in an external system and connected via the communication line, and a plurality of systems shown in FIG. 15 may be connected to each other by the communication lines and configured to cooperatively operate each other. Also, the shown configuration may be incorporated into a copier, a facsimile, a scanner, a printer, a complex machine (an image processing apparatus having two or more functions of the scanner, the printer, the copier and the facsimile), and the like.

In the meantime, one postcard may be associated with a plurality of movies. For example, following configurations are also possible.

When preparing a postcard with the information processing apparatus (preparation processing) 100, a plurality of movies may be selected and frames may be extracted from each of the movies. Then, the frames may be arranged in response to an operation of the user and may be then prepared as a postcard.

The application server 310 (or information processing apparatus (application server) 1300) may be configured to associate a plurality of pairs of the image feature values and the movie URL with one postcard information.

When reading the postcard with the information processing apparatus (reading processing) 200 (or information processing apparatus (reading apparatus) 1200), the image feature values of the image read by the preview may be matched with each of the plurality of image feature values downloaded from the application server 310 (or the plurality of image feature values stored in the information processing apparatus (application server) 1300), and when a difference therebetween is equal to or less than a predetermined threshold, the movie URL associated with the matched image feature values may be acquired.

Alternatively, when preparing a postcard with the information processing apparatus (preparation processing) 100, a plurality of frames is extracted from one movie. Then, a movie corresponding to each frame may be associated with movie start time of the movie. That is, the movie corresponding to the image may be skipped up to the movie start time thereof and then reproduced.

In the meantime, the described program may be provided with being stored in a recording medium or may be provided via a communication means. In this case, for example, the above described program may be interpreted as an invention of 'a computer-readable recording medium having a program recorded therein'.

The 'computer-readable recording medium having a program recorded therein' refers to a computer-readable recording medium having a program recorded therein, which is used to install, to execute, to distribute and the like the program.

In the meantime, the recording medium includes, for example, a digital versatile disc (DVD), such as 'DVD-R, DVD-RW, and DVD-RAM' complying with the standard formulated by the DVD forum and 'DVD+R and DVD+RW' complying with DVD+RW standards, a compact disc (CD), such as a read-only memory (CD-ROM), a CD recordable (CD-R) and a CD rewritable (CD-RW), a Blu-ray disc (registered trademark), a magneto-optical disc (MO), a flexible disc (FD), a magnetic tape, a hard disk, a read-only memory (ROM), an electronically erasable and programmable read-only memory (EEPROM (registered trademark)), a flash memory, a random access memory (RAM), and a secure digital (SD) memory card.

The above-described program or a part thereof may be stored in the recording medium for storage and distribution. The program or a part thereof may be transmitted via a transfer medium including a wired network, which is used in a local-area network (LAN), a metropolitan-area network (MAN), a wide-area network (WAN), the Internet, an intranet, and an extranet, a wireless network, or a combination thereof. The program or a part thereof may also be transmitted over a carrier wave.

Further, the above-described program may be a part of another program, or may be stored in the recording medium together with another program. The program may be split to be stored in a plurality of recording media. The program may be processed in any fashion before being stored as long as the program remains restorable, such as being compressed or encrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program for causing an information processing apparatus to function as:
    an imaging unit that captures an image;
    a search request unit that requests a search by using identification information for identifying a person described in the image or a medium having the image printed thereon, the identification information being captured by the imaging unit;
    a reception unit that receives image feature values corresponding to the identification information, as a result of the search;
    an image feature extraction unit that extracts image feature values from the image captured by the imaging unit, the extracted image feature values being a part of the image captured by the imaging unit describing a visual aspect of the image captured by the imaging unit;
    a correspondence determining unit that determines whether the received image feature values match the extracted image feature values; and
    an acquisition unit that acquires information for accessing a content or content information when the correspondence determining unit determines that the received image feature values match the extracted image feature values.

2. A non-transitory computer readable medium storing a program for causing an information processing apparatus to function as:
    a storage unit that stores image feature values corresponding to identification information for identifying a person or a medium;
    a reception unit that receives a search request using the identification information, the identification information being derived from textual information that is visibly part of an image, the image describing a person and being printed on a medium;
    a search unit that searches the image feature values stored in the storage unit by using the received identification information; and
    a transmission unit that transmits image feature values corresponding to the identification information, as a result of the search, the transmitted image feature values having been a part of an image captured by an imaging unit and describing a visual aspect of the image captured by the imaging unit.

3. A non-transitory computer readable medium storing a program for causing an information processing apparatus to function as:
    an imaging unit that captures an image;
    a transmission unit that transmits the image;
    a search request unit that requests a search by using identification information for identifying a person described in the image or a medium having the image printed thereon, the identification information being derived from textual information that is visibly part of the image captured by the imaging unit;
    an image feature extraction unit that extracts image feature values from the image captured by the imaging unit, the extracted image feature values being a part of the image captured by the imaging unit describing a visual aspect of the image captured by the imaging unit;
    a correspondence determining unit that determines whether image feature values corresponding to the identification information match the extracted image feature values; and
    an acquisition unit that acquires information for accessing a content or content information when the correspondence determining unit determines that the image feature values corresponding to the identification information match the extracted image feature values, as a result of the search.

4. A non-transitory computer readable medium storing a program for causing an information processing apparatus to function as:
    a storage unit that stores image feature values corresponding to identification information for identifying a person described in an image or a medium having an image printed thereon;
    an image receiving unit that receives the image;
    a search unit that searches the image feature values stored in the storage unit by using identification information for identifying a person described in the received image received by the image receiving unit or a medium having the received image printed thereon, the identification information being derived from textual information that is visibly part of the image received by the image receiving unit; and
    a transmission unit that transmits information for accessing a content or content information, which is a result of the search, when image feature values corresponding to the identification information of the received image and image feature values extracted from the received image correspond to each other, the extracted image feature values being a part of the received image and describing a visual aspect of the received image.

5. The non-transitory computer readable medium according to claim 2,
wherein an accessible deadline is set for the information for accessing the content or the content information, and
wherein the information processing apparatus further functions as a fee charging unit that charges a fee, in response to a request for extension of the deadline.

6. The non-transitory computer readable medium according to claim 4,
wherein an accessible deadline is set for the information for accessing the content or the content information, and
wherein the information processing apparatus further functions as a fee charging unit that charges for charging a fee, in response to a request for extension of the deadline.

7. The non-transitory computer readable medium according to claim 1, wherein conversion information converted in a predetermined manner is used as the identification information.

8. The non-transitory computer readable medium according to claim 3, wherein conversion information converted in a predetermined manner is used as the identification information.

9. The non-transitory computer readable medium according to claim 2, wherein conversion information converted in a predetermined manner is used as the identification information.

10. The non-transitory computer readable medium according to claim 4, wherein conversion information converted in a predetermined manner is used as the identification information.

11. The non-transitory computer readable medium according to claim 1,
wherein the identification information is extracted based on a text character in the textual information.

12. The non-transitory computer readable medium according to claim 2,
wherein the identification information is extracted based on a text character in the textual information.

13. The non-transitory computer readable medium according to claim 3,
wherein the identification information is extracted based on a text character in the textual information.

14. The non-transitory computer readable medium according to claim 4,
wherein the identification information is extracted based on a text character in the textual information.

* * * * *